Feb. 4, 1936.　　　H. M. SWAIN　　　2,029,447
AUGER BIT
Filed Dec. 13, 1934

INVENTOR
HOWLAND M. SWAIN.
BY Toulmin & Toulmin
ATTORNEYS

Patented Feb. 4, 1936

2,029,447

UNITED STATES PATENT OFFICE 2,029,447

AUGER BIT

Howland M. Swain, Wilmington, Ohio, assignor to The Irwin Auger Bit Company, Wilmington, Ohio, a corporation of Ohio Application December 13, 1934, Serial No. 757,284

5 Claims. (Cl. 145—116)

This invention relates to auger bits and in particular to the shaft of the auger.

It is the object of the invention to provide a shaft having a multiple use so that a single auger bit may be employed in a bit brace, a power drill, such as an electric drill, or with an auger handle or with an extension rod.

Heretofore it has been necessary to supply large and expensive bits, such as ship augers, which have very long auger bit bodies therefor, quite expensive, in four different types and of course in a variety of sizes. The present invention eliminates these disadvantages and provides, in a single bit, a four-way shank which is ready for use in a bit brace, which can be cut off for use in an electric or air drill, or can be cut off at another point for use with auger handles, or it can be cut off and an extension rod welded on the shank.

It is a further object to provide a hard steel bit and shank, with the shank softened or left soft at the points where the shank is to be severed so that the shank can be cut by a hack-saw in order to adapt it to any of the uses to which the ship auger is put.

Referring to the drawing.

Figure 1:
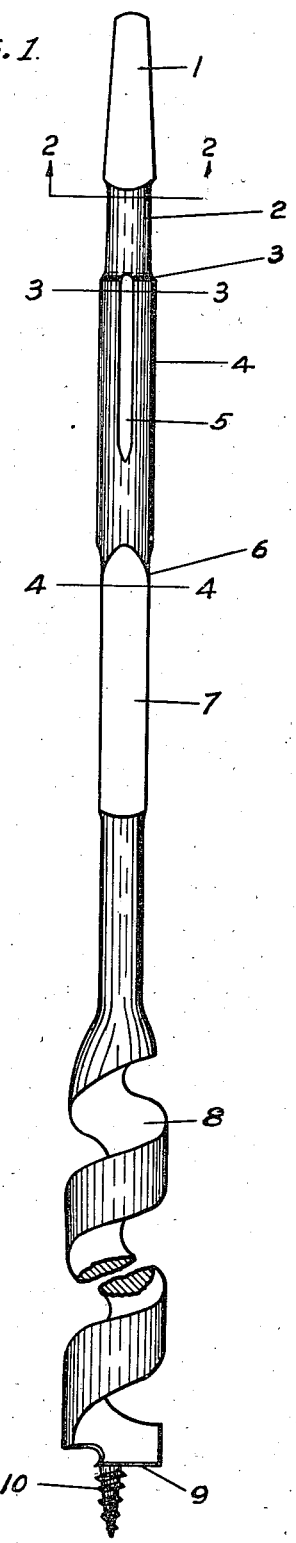
Figure 1 is a side elevation of the auger bit.
Figure 2:
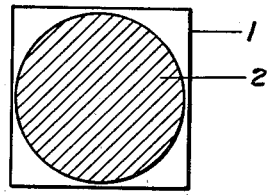
Figure 2 is a section on the line 2—2 of Figure 1.
Figure 3:
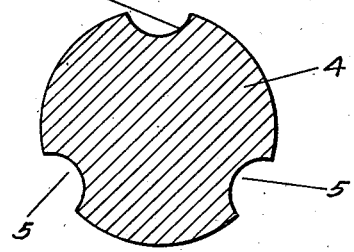
Figure 3 is a section on the line 3—3 of Figure 1.
Figure 4:
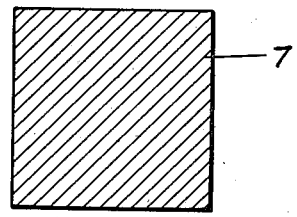
Figure 4 is a section on the line 4—4 of Figure 1.

Referring to the drawing in detail, the numeral 1 designates a tapered square head for use in a bit brace. This portion of the shank of the bit is of hardened steel. The head 1 is supported upon a cylindrical shaft 2 of the shank, which is softened or left soft at 3 so that a hack-saw may be used to cut off the tapered square head 1 when it is desired to use the auger bit in an electric or air drill. When it is so used the cylindrical portion 4 of the shank, having the grooves 5 for engagement with the chuck of the drill, is employed. This section 4 is grooved and machined, as shown for the three-jaw chuck on electric drills or for the set screw chuck on air drills.

In the event it is desired to use the auger bit with auger handles, the shank is left soft at 6 so that it can be cut through at this point with a hack-saw, and then the portion 7 can be used with the auger handle. In the event it is desired to have an extended shank, a rod for this purpose can be welded at 6 to the squared end 7 in order to provide the extension rod and give the extra length required in the bit.

The numeral 8 represents the usual screw flight, 9 the cutting lip and 10 the entering screw of the auger. The screw flight 8 is of heat-treated steel in order to perform satisfactorily the boring operation.

This auger bit is forged from a single rod of steel, which is heat-treated throughout the entire length so as to insure a spring temper, with the result that the auger bores perfectly true, and will stay sharp much longer. The shank is left soft at the cutting points so that a hack-saw can be used effectively in severing the shank according to the type of tool in which it is desired to use the auger bit.

It will be understood that it is desired to comprehend within this invention such modifications as come within the scope of the claims and the invention.

Having thus fully described the invention, what is claimed as new and desired to be secured by Letters Patent, is:

1. In an auger bit the combination of a screw flight portion, and a shank portion, said shank portion comprising sections of different configuration joined by zones of softer material so that the shank can be severed at intervals between the sections of different configuration.

2. In combination in an auger bit of a screw flight and a shank, a tapered squared end on the end of the shank, a drill-receiving portion comprising a cylindrical body with longitudinal grooves adjacent said end of the shank, a squared portion for use with an auger handle adjacent the drill portion, all of said portions comprising hardened steel and softer zones capable of being sawed being located between each of said portions so they can be severed from one another by a saw.

3. In an auger bit, a shank portion formed from an extended rod, and a relatively larger screw flight portion, said shank portion comprising a plurality of sections of different configuration of relatively hard steel joined by sections of softer steel capable of being sawed with a metal saw.

4. In an auger bit, the combination of a shank portion and a screw flight portion, said shank portion comprising a square tapered head and a cylindrical shaft of hardened steel and then a connecting portion of soft steel connecting a cylindrical portion of hardened steel for use in a drill and then a softened area of soft steel connecting a square portion of hardened steel which terminates in the flight of the screw of the auger bit.

5. As a new article of manufacture, an auger bit comprising a screw flight and a shank integral therewith; the shank being formed of areas of different cross sections and of hardened steel joined by areas of softer steel, whereby the shank may be transversely severed at such softer places, for the purposes described.

HOWLAND M. SWAIN.